Figure 1:
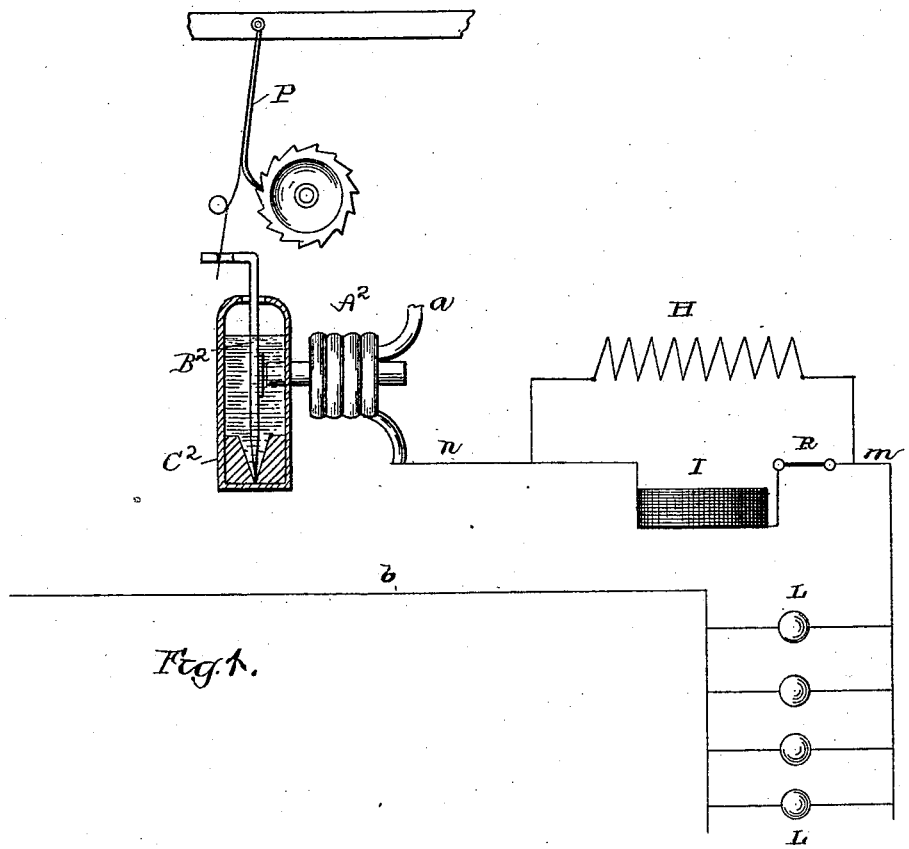

(No Model.) 2 Sheets—Sheet 1.
E. THOMSON.
ELECTRIC METER.
No. 395,018. Patented Dec. 25, 1888.
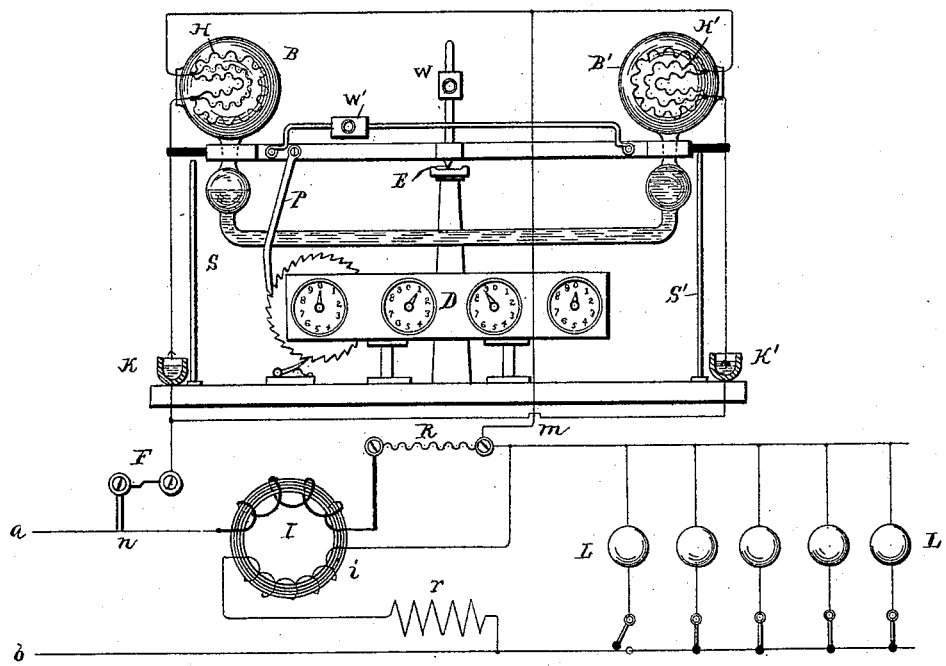
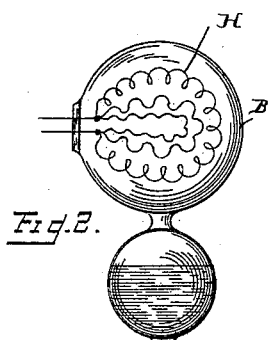
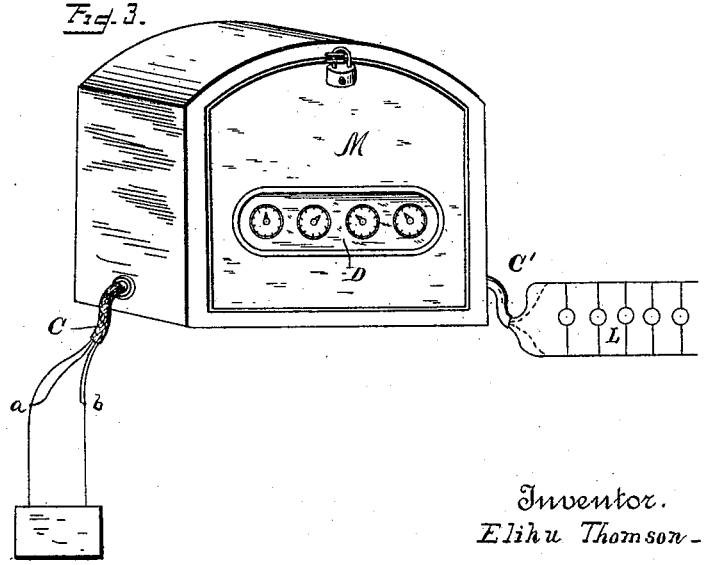
Witnesses.
Ira R. Steward.
Wm. H. Capel.
Inventor.
Elihu Thomson
By his Attorneys,
Townsend MacArthur (No Model.) 2 Sheets—Sheet 2.

E. THOMSON.
ELECTRIC METER.

No. 395,018. Patented Dec. 25, 1888.

Witnesses,
Ira R. Steward
Wm. H. Capel

Inventor,
Elihu Thomson,
By his Attorneys
Townsend & MacArthur

UNITED STATES PATENT OFFICE.

ELIHU THOMSON, OF LYNN, MASSACHUSETTS.

ELECTRIC METER.

SPECIFICATION forming part of Letters Patent No. 395,018, dated December 25, 1888.

Application filed August 3, 1888. Serial No. 281,913. (No model.)

*To all whom it may concern:*

Be it known that I, ELIHU THOMSON, a citizen of the United States, and a resident of Lynn, in the county of Essex and State of Massachusetts, have invented a certain new and useful Electric Meter or Motor, of which the following is a specification.

My present invention relates to improvements in electric meters, and is especially applicable to meters in which heating-coils expand a fluid—such as air—and cause the operation of a registry apparatus, as described in prior patents of mine, Nos. 381,441, 381,442, and 381,443.

My improvements are also applicable to meters in which other means of registering current are employed.

The meter herein shown is designed especially for registering the flow of alternating currents.

The object of my present invention is especially to secure a registry when very few lamps are used, as one lamp, and at the same time give a proper registry up to twenty, thirty, or more lamps, as the case may be. Where a meter is so constructed that its full load renders it properly operative without demanding an excessive proportion of the energy of the circuit, it is apt to be less sensitive to small loads, as one lamp. Moreover, it is often desirable to secure a higher registry on a few lamps and a lessened registry per lamp as the load comes on, thus, as it were, automatically discounting or giving the advantage to the consumer when he is using a large number of lamps, and charging a higher rate when very few lamps are employed.

My invention consists in determining or regulating the proportion of current flowing in the meter to produce the difference in action stated by the means of what I denominate a "current-determining coil" placed, preferably in derived circuit to the work or otherwise located, so as to vary in energy with the amount of work and the energy to be measured. The action of such coil I utilize through any proper devices, as well understood in the art, to vary the flow of current to the meter itself. In the case of alternating currents the current-determining coil may conveniently act by induction upon the circuit of the meter to vary or determine the flow of current to the same, the decrease of energy of the coil due (when the coil is in derivation to the work) to increase of work being followed by a decrease of its inductive influence upon the circuit of the meter, and resulting in a decrease in the proportion of current flowing to and affecting the meter. The portion of meter-circuit upon which the coil acts is preferably a coil placed in a branch to the meter, as will be hereinafter more particularly described, the two coils being assembled in inductive relation to one another after the manner of the coils of an alternating-current converter or induction-coil.

My invention consists, also, in the special combinations of coils and devices, whereby the general objects of my invention are accomplished.

My invention consists, further, in interposing between the counting or indicating portion of the meter and the electric-motor portion of the same a suitable means for connecting and disconnecting the one from the other, such connecting and disconnecting device being operated by a magnet or similar means responsive to the current and arranged to stop the registry when a small current only is flowing. The object of this expedient is to increase the promptness with which the meter will begin to act when the consumption of current should begin to be measured by permitting a small current to flow through the same when no translating devices are in operation without, however, causing registration in the meter.

In the accompanying drawings, Figure 1 is a side elevation of a form of electric meter and a plan or diagram of circuits and apparatus embodying my invention, a part of the meter apparatus being, however, omitted. Fig. 2 is a separate view of one of the heating-bulbs, in which air or other fluid is expanded for operating the meter. Fig. 3 shows the preferred arrangement of the wires leading to and from the meter. Fig. 4 is a side elevation of a part of the meter omitted from Fig. 1 in order to simplify the figure.

In Fig. 1, B B' are glass bulbs containing the heating-conductors H H', respectively, the bulb B being connected by a tube at the lower part with the bulb B', which tube terminates in smaller bulbs, and the small bulbs and connecting-tube being filled with a liquid—such as dilute sulphuric acid—which will not freeze.

The heating-conductors are preferably made, as shown in Fig. 2, of a number of fine platinum wires, whose ends are attached to another wire passing through the glass bulb B, so that the entering current can very quickly communicate the heat produced by it to the air or gas in the bulb, thereby causing almost instantaneous expansion of the same and driving the liquid in the tube connecting the bulbs from side to side, so as to shift the center of gravity of the system and cause it to oscillate around the pivot E, as shown in Fig. 1. Suitable stops, S S', are provided to limit the swing of the system to a very small amount. This limitation is essential to the sensitiveness of operation of the device. It is also advisable that the center of gravity of the system of bulbs and connecting parts be made to exist a little above the point of support when the liquid is equally distributed. This can be done by counterpoising-weights properly arranged so as to shift the center of gravity. I have shown two such weights at W W', the one at W being capable of being raised or lowered, while the one at W' can be moved on a horizontal wire and fixed in any suitable position. The pawl P, carried by the oscillating structure, operates a train of wheels or other registry device, D, in any well-known manner. Contact-points—such as vessels K K', partly filled with mercury—are arranged so that one terminal of either coil H or H' may be circuited by dipping into the mercury-cups alternately, the other terminals being connected together by one wire to the feeding-line $m$. The wires feeding the lights L L with alternating currents—such as are furnished by a transformer or induction-coil—are marked $a$ $b$, and the meter is placed, as shown, as a branch between points $n$ and $m$ on the wire $a$, a fuse, F, being interposed in the branch circuit so made. The fuse F is made very short and of fine platinum wire, and during normal operation is always heated to a greater degree than either the coil H or H' would be heated. This is done to prevent damage to the meter coils or conductors H or H' in case of an overload, as by fusing it will cut off connection with the meter. Between the points $n$ and $m$ on the wire $a$ are placed a few turns of wire, I, forming the coarse winding of a small induction-coil or other form of converter, and the resistance R in series with I. The resistance R is preferably made of platinum wire or of other metal or heat-resisting compound, and has such a section that it heats rather more under load than the coils H and H' do. Thus, if the meter be used heavily loaded and the coils H H' are heated to a dull red, the wire R would under the same conditions be bright red. This, however, would be a large load for the meter. The wire R is made an inch or two long in ordinary cases and the coarse winding I simply a few turns of copper or other wire. In inductive relation to the coil I, first mentioned, is a much finer coil, $i$, which may also be in series with a resistance, $r$, or the winding $i$ itself may be made to have the requisite resistance by selecting its material and fineness accordingly. The connections in this case are from one wire, as $a$, through the coil $i$ and the resistance $r$ to the wire $b$, so as to form a branch of high resistance around the lights L L, the coil $i$ in this branch acting inductively on the coarse coil I in shunt to the meter between $m$ and $n$. The coils I and $i$ are preferably placed parallel on the same core or inclosed together in sheet-iron or iron wire of very moderate amount, as it is found that a comparatively small amount of inductional action is all that is needed in practice. The resistance $r$ is made quite high, as by winding fine German-silver wire on the spool, and its amount is adjusted to give the desired effects in the meter. So, also, is the resistance R adjusted in amount as may be needed.

As above stated, the coil $i$ may have the requisite resistance and coil $r$ be dispensed with. The terminals of the coil I are connected to the circuit in such way that the direction of a current which any current passing in the coil $i$ tends to develop in said coil I will be opposite to the direction of the current tending to flow in the circuit of the two coils I and R, as due to the potential directly imparted from the mains.

The operation is as follows: When a large load of lamps, L L, is in use, a current passing between $a$ and $b$, alternating in character, also passes by necessity through the coil I and the resistance R as one branch and a portion thereof through the fuse F and the meter, which portion causes the operation of the meter. The vigorous current passing in the coarse coil I at the same time acts inductively on the fine-wire coil $i$, so as to check the passage of current in it from one wire, $a$, to the other wire, $b$, under the conditions mentioned, or even to generate a set of impulses or alternations in the fine wire, which are themselves delivered to the wires leading to the lamps. The resistance R, placed in the circuit to the coil I, forces the current through the meter branch, and in order that the balance or proportion of resistance may be maintained under all conditions the wire R, of platinum, is proportioned to heat rather more than the wire, also of platinum, H H', in the meter. Should the load now be taken off, with the exception of one lamp, the current in the coil I is very much reduced, so that the resistance R would not oppose the passage of current to a sufficient degree to cause the meter to register at all. It is here that the inverse induction comes in to assist the registry of a small load, as of one lamp or more. Under the condition mentioned a current passes from one feeding-wire to the other through the branch containing the finer wire coil, $i$, of the induction-coil, and thereby produces in the coarse coil I a counter electro-motive force, which prevents the branch between $m$ and $n$, consisting of the coarse coil I and resistance R, from conveying the current, thus forcing the current of the small load to go almost entirely by the meter branch. The meter thus gets the full benefit of the current passing with a small load, and as load is thrown on a greater and greater portion of it is shunted around the meter by the automatic means provided, as described. It is advantageous to make the adjustments of the resistance mentioned above and the inductive actions between the coil I and coil $i$ of such proportion that when there is no load on or when there are no lamps in use the meter will be just on the point of registering as a result of a current passing through the branch $i$ and $r$ and actually generating in the coarse coil I, opposed thereto, an electro-motive force which almost suffices to feed current to the meter to make it move. The meter becomes by this means very sensitive to one lamp or to a fraction of a lamp and registers a greater amount in proportion for such small loads, and as the load is put on by the addition of lamps the ratio of registry per lamp gradually diminishes until at normal loads it becomes pretty nearly constant. This is an advantage in the adjustment of charges which makes it possible to automatically discount the charges when a considerable number of lamps are used, or, as it were, to increase the rate of charge when a very few lamps only are kept alight. By adjusting the apparatus, however, for less sensitiveness than has been just stated the meter registry becomes more uniform throughout the range of load.

In Fig. 3 I have shown the meter as inclosed in a box, M, with registry-dials in front, and this is the preferred arrangement. I also prefer to introduce both conductors, $a$ $b$, into the meter-box in the form of a cable, C, which may be composed of several wires insulated and interlaced or twisted together, some of which wires are grouped for conveying the current forming the line $a$ and the other grouped as the other line, $b$. Some of the wires may, in fact, be dead-wires and not connected with either line. The wires at C', leading from the meter to the lights, are preferably similarly twisted and grouped. This arrangement makes it difficult for a dishonest person to form an artificial shunt around the meter, so as to lower its registry or to stop its registry, and at the same time considerable facility is given for making the necessary connections to the meter. The twisting of the wires in the manner specified in passing the cable through the meter makes it difficult to identify the different wires, and since alternating currents are employed corresponding wires are very difficult to discover. This prevents, as stated, the possibility of partial shunting, which might be done in an unwarranted manner to lower the registry.

I do not limit myself to exclude making the relations between coils I and $i$ such that even without load the meter moves infrequently or at comparatively long intervals.

It will be observed that the coil $i$ acts to determine the flow to the meter by operating inductively upon the meter-circuit, and this is the simplest form that my invention may take, especially with alternating currents. It is well understood, however, by electricians that there are other ways in which an electric coil or other electric appliance may operate to produce changes in the current in another circuit or portion of circuit, and it will be obvious that the principle of my invention is not necessarily confined to a current determining coil working by induction to influence the flow of current or the resistance to current in another circuit.

I do not limit myself to the proportion of current which shall be allowed to flow when no translating devices are in operation, or when the number is so small that it is not desired that the register should indicate the consumption of current. It is desirable that there should be some current flowing at all times in the meter in order that in the case of a meter of the form described it may be kept warm, so that it will more readily and promptly begin to operate when translating devices are thrown into operation and the consumption is to be registered.

In order to avoid registration of the current when no translating devices are in operation, or to prevent the possibility of registration in those cases where the flow of current is so small as not to require registry, I employ a device of the general character indicated in Fig. 4, and consisting, essentially, of some mechanism of any proper character for disconnecting the motive portion of the register and the indicating appliances when the current falls to the point where no register is desired. An example of a simple means for connecting and disconnecting the motive portion of the register and the indicating appliance is shown in Fig. 4, and consists, essentially, of an actuating-pawl, P, for the register properly connected with the armature $B^2$ for an electro-magnet, $A^2$, so that when the electro-magnet $A^2$ loses its power the armature $B^2$ in dropping back will move the pawl out of position for actuating the wheel. Under this condition the motive portion of the register may obviously continue to operate without producing a registration of the current flowing. The magnet $A^2$ is included in the general circuit, as indicated. The retracting force of the armature $B^2$ is made very slight, so that only on a decrease of current below that required to be registered will the disconnection described be effected.

In order to prevent a humming noise from the armature, which is frequently produced in meter apparatus placed on alternating-current circuits and employing electro-magnets in a portion of the apparatus, I propose to interpose a dampening-film of liquid between the armature and pole of the magnet. Such a film can be produced by simply applying a drop of oil to the face of the armature; but in order to avoid capillary sticking and the necessity of frequent application of oil, I propose to mount the armature in a receptacle, $C^2$, as indicated, containing the oil or other liquid. When the armature is drawn up to the pole of the magnet, a slight film of the liquid will remain interposed and will have the effect of preventing the annoying humming or singing of the armature.

What I claim as my invention is—

1. The combination, with an electric meter, of a current-determining coil connected to the circuits at or near the point of consumption and carrying electric energy varying in proportion to the changes in the number of translating devices in use, and a meter-circuit connected with means for decreasing the proportion of current flowing to the meter as the current to be measured increases, said means being controlled or adjusted in its action by the first-named coil.

2. The combination, with an electric meter, of a coil in derivation to the work and a coil in derivation to the meter, said coils being in inductive relation to one another, as and for the purpose described.

3. The combination, with an electric meter, of a coil in the main circuit with the work and in derivation to the meter, and a coil in derivation to the work and in inductive relation to the first coil.

4. The combination, with an electric meter, of a converter one coil of which is of low resistance in the main circuit and connects with the meter, while the other is of high resistance and carries a current which decreases with the load to be measured.

5. The combination, with the meter, of the resistance in the branch adjusted to heat rather more than the resistance-wire in the meter, as and for the purpose described.

6. In an electric meter, a heater composed of a number of fine conductors through which the current passes in multiple, as and for the purpose described.

7. The combination, with an electric meter, of an induction-coil having one wire in a branch to the meter containing a resistance, R, and the other wire in a branch to the work.

8. The combination, with an electric meter, of a converter or induction-coil one circuit of which is connected to the meter-circuit for adjusting or regulating the rapidity of action of such meter, while the other coil is placed in derivation to the translating devices at or near the point of consumption, as and for the purpose described.

9. The combination, with the pivoted liquid-containing receptacle and heaters therefor acting alternately, of a register-train and adjustable weights vertically and longitudinally adjustable on the pivoted receptacle, as and for the purpose described.

10. The combination, with the register or indicating parts and the motor portions for an electric meter constantly in circuit, of a suitable means for connecting and disconnecting the same and a controlling-magnet or other electro-responsive device adjusted in the manner described to disconnect them when no translating devices are in operation, as and for the purpose described.

11. The combination, with a magnet on an alternating-current circuit and an armature therefor, which is held in contact with the magnet during a number of successive alternations, of a dampening-film of liquid between the armature and pole-face, whereby humming of the armature under the effect of the alternating currents may be prevented.

12. The combination, with an electric meter connected in series with the work, of a converter one coil of which connects with the circuit of the meter, while the other carries a current variable with the work.

Signed at Lynn, in the county of Essex and State of Massachusetts, this 26th day of July, A. D. 1888.

ELIHU THOMSON.

Witnesses:
J. W. GIBBONEY,
E. WILBER RICE, Jr.